United States Patent Office 3,156,550
Patented Nov. 10, 1964

3,156,550
SEED STOCK PROTECTING AGENT IN
DRILLABLE FORM
Ernst-August Bartels, Wiesbaden, Germany, assignor to
Chemische Werke Albert, Wiesbaden-Biebrich, Germany, a corporation of Germany
No Drawing. Filed Sept. 6, 1960, Ser. No. 53,899
Claims priority, application Germany Sept. 3, 1959
6 Claims. (Cl. 71—2.4)

This invention relates to treating agents for seed stock in a drillable granular form and to the production of such agents; and, more particularly, to granular and drillable treating agents for seeds which protect the seeds before and during germination and thereby assist in increasing crop production.

Many attempts have been made to grow crops more efficiently by coating seeds with adjuvants which have the effect of increasing the crop produced from a given quantity of seeds. Attempts have been made to coat the seeds with agents which will protect the seeds against deterioration or destruction when they are planted and/or during the germination period. For instance, efforts have been made to protect seeds against deterioration by coating them with fungicides or the like and to protect them against destruction by various pests by coating them with pesticides such as insecticides, nematocides or bactericides or the like. Likewise, attempts have been made to increase crop production by coating, or treating, seeds with micro- or macronutrients or with plant growth regulators such as plant hormones or vitamins. In many instances, these efforts at increasing crop production by coating seeds with such agents have proven far from successful.

As is known, efforts have been made to control pests which damage seeds during germination by dusting or encrusting them with insecticides. When dusting seeds, it is expected that each grain of seed will have adhering thereto a certain quantity of insecticide and that this adhering insecticide will be sufficient to kill the insect when it attacks the seed. With certain pests, as for instance vegetable fly larvae, sufficient amounts of the insecticide cannot be coated on the seed stock by dusting to control the pests. Under these circumstances, encrustation processes are necessary. In such processes, an adherence of a greater quantity of the insecticides, per kg. of seed stock, is obtained by applying the insecticides to the seed dispersed or dissolved in water or some other relatively non-volatile liquid. Such encrustation processes, however, have the disadvantages of requiring a relatively difficult pretreatment of the seed stock and the treated seed must be dried before it can be sowed. Additionally, a relatively thick layer of insecticide ultimately becomes coated on to the propeller wheels of the sowing machine whereby a uniform sowing of the feed stock is adversely influenced.

It is known also, for instance, that insecticides dissolved in organic solvents have been applied to granular substances such as superphosphate and that the granular materials coated with the insecticides obtained after the evaporation of the solvent are then sowed in a drill together with the seed stock. Such a "joint drilling process" has certain advantages of a technical nature. For example, it is possible to adjust the amount of seed being sowed per hectare to any desired small amount relative to the amount of other material being drilled into the soil. Additionally, any complicated pre-treatment of the seed stock is avoided since the mixing of the seed stock and the material to be drilled into the soil can be done without difficulty, as for instance, in the field in a fertilizer vat. On the other hand, such a process also has certain disadvantages for the agent protecting the seed adheres firmly to the other material being drilled into the soil and the effect on the seed is dependent upon the interval between the other drilled material and the grains of seed. The smaller the number of seeds and granular drillable material per hectare, the greater the interval between the granules and the seed and the less insecticidal effect is available for the protection of the seed stock. Yet, the quantity of the agent to be drilled into the soil together with the seed per hectare is restricted within certain limits and cannot be enlarged at will so that frequently an insufficient insecticidal effect is obtained.

The present invention has as an important objective the provision of a drillable granular substance which can be mixed with seed in desired quantities and drilled into the soil and thereby fully protect the seed against deterioration and pests both initially and during germination.

Other features and objectives of the invention will become apparent from the more detailed description which follows.

This invention relates to drillable seed protecting agents suitable for use in a so-called "joint drilling process." In accordance with the invention, a granular drillable carrier of a desired particle size is first coated with a strongly adherent layer containing a seed protecting agent. This layer must be at least partially decomposable by the moisture in the soil during the germination period of the seed to be protected. This layer may be obtained by impregnating a dry carrier with liquid medium containing the seed protecting agent, or the carrier can be coated with a strongly adherent layer of a composition containing the seed protecting agent which is strongly resistant to abrasion but can be detached or dissolved by the moisture in the soil. After this first layer is applied, a second layer containing the same, or another seed protecting agent is then applied over the first layer. This second layer must also have a certain amount of adhesivity and a certain resistance to removal by mechanical means, such as by friction, but its adhesion to the first layer and the carrier must be of such a low order that the effective quantities thereof can be transferred to the seed when the seed stock is mixed with the coated granules. Generally speaking, the adhesivity of the second layer is of a substantially lower order than the adhesivity of the first layer so that, upon mixing the seed and the coated carrier, ample seed protecting agent is transferred to the seed from the second layer to initially protect the seed while ample reserve protection is afforded by the seed protecting agent retained on the carrier in the more adherent first layer.

When, in accordance with this invention, one mixes the seed protecting agents hereof with seed and drills them into the soil, one obtains the advantages of both seed stock dusting processes and joint drilling processes without their disadvantages. After mixing, every grain of seed is supplied on its surface with a certain quantity of substance which is effective in protecting the seed and each seed is thereby protected individually. After drilling, the granular substance which retains the initial layer supplies a reserve of the seed protecting substance. Since the carrier may be partially or wholly inert, the joint drilling of the seed stock and the granular seed protecting material permits the introduction into the drill line of very small quantities of uniformly distributed seed with ample quantities of the agent which protects the seed stock. On the other hand it is not necessary, as in the process of encrustation, to pretreat the seed stock with aqueous dispersions, or other types of dispersions, of the seed protecting agent.

During the mixing operation, much of the superficially applied layer is transferred, largely by friction, to the seed stock. Due to this technique, useful insecticidally effective substances are not limited to those with a high vapor tension. Also, by use of the drillable agents of this invention, fungicides, for instance, can be applied to the seed stock. The protection of seed stock against fungi is, in most cases, absolutely necessary.

Both active and inert carriers for the seed protecting agents, or mixtures thereof, may be used. Most any type of inert carrier may be used including granular substances such as sand, fine gravel, cinders, slag, pumice or similar substances. Such inert carriers may be used alone or conjointly or in admixture with one another or with active substances such as various fertilizers, plant growth stimulants, trace elements, etc. Active substances may be used alone as carriers also. Active substances, especially include those which increase plant growth or crop yield such as synthetically manufactured granulated materials from raw phosphates, including super-, double- and triple-superphosphates, ground basic slag or multiple nutrient fertilizers. These active materials may contain fillers such as talc or precipitated chalk. Micronutrient substances can be readily worked into such extenders.

In accordance with another embodiment of the invention, so-called soil conditioners, such as various types of acrylic compounds, may be used alone or conjointly as carriers for the seed protecting agents.

Finally other granular and dry substances such as grit, sago or non-germinating seeds can serve as carriers.

The foregoing enumeration of suitable carriers, which is not exhaustive, clearly shows the great variety of carriers which are suitable and demonstrates the adaptability of the process for producing drillable seed protecting agents having the advantages pointed out above.

The diameter of the carrier should be such as to make the final product readily drillable. Usually the carrier has a diameter of 0.5 to 5 mm., preferably 1 to 3 mm., and its maximum moisture content should be about 20%, preferably 5 to 10%.

After a suitable carrier is selected, a first layer containing one or more plant protecting agents is applied thereto. Usually this layer is applied as a solution, or a liquid dispersion, of the active substance and an adhesive substance. Where necessary, or desirable, inert carriers may be used as a diluent or extender for the seed protecting agent used in this layer. Water or organic solvents are usually used as the solvent or dispersion media. A great variety of substances having adequate adhesivity are available. Pitch powder, casein, certain glues, cellulose derivatives and the like have proven to be satisfactory and are practicable although other organic or inorganic substances with good adhesivity may be used. As inert carrier substances for seed protecting substances, precipitated chalk, kieselguhr, kaolin, clay or the like can be used.

The effective substance and the adhesive, or gluing agent, may also be applied separately. For instance, the adhesive may be applied to a carrier which has been dusted with the active material.

A great variety of active substances may be coated onto the carrier especially those serving to protect the seed against fungi and other pests. Suitable active substances include:

(I)

Insecticides
Hexachlorocyclohexane (Lindane)
Hexachlorohexahydrodimethanonaphthalene (Aldrin)
Hexachloroepoxyoctahydrodimethanonaphthalene (Dieldrin or Endrin)
1,2,4,5,6,7,8,8-octachloro-4,7-methano - 3a,4,7,7a - tetrahydroindene (Chlordane)
1,4,5,6,7,8,8a-heptachloro-3a,4,7,7a-tetrahydro-4,7 - endomethanoindene (Heptachlor)
Dichlorodiphenyltrichloroethane (DDT) and others.

(II)

Fungicides
Copper compounds
Organic mercury compounds
Hexachlorobenzene
Tetramethylthiuramdisulfide (TMTD)
The trichloromethylthiotetrahydrophthalimide (Captan)
Zincethylenebisdithiocarbamate (Zineb)

(III)

Bactericides
Organic mercury compounds (IV)

Nematocides
Sodium-N-methyl-dithiocarbamate (V)

Seed nutrient substances and/or micronutrient substances (VI)

Growth regulators, such as hormones, vitamins, etc.

Combinations of these effective substances with each other are also possible.

On the first layer containing the above or like substances, which has a sufficient stability and adhesivity, but which gradually dissolves or decomposes in the soil, a second layer of effective substances is applied. This second layer is to function physically in a different way and it, therefore, has other physical characteristics. When the granular drillable material containing both layers is mixed with the seed stock, this second layer must transfer to the seed such a quantity of the active seed protecting agent that each individual seed is supplied with the active agent.

It has been found that layers containing active substances, such as set out above, have adequate adhesivity to initially adhere to the carrier and yet transfer in adequate quantities to the seed when they are finely ground and applied together with finely ground natural resins, such as colophony, or together with certain finely ground synthetic resins. The active substances and the resin may be separately or conjointly ground to the proper particle size. Both the resin and the active material should be ground to a fineness of minus Din 100 (sieve with 10,000 mesh per cm.$^2$) and are to be applied on the first layer of effective substances very carefully mixed together and dry. With this, 50 to 98%, preferably about 75% effective substance and 50 to 2%, preferably about 25% resin are used. Beside colophony also solid synthetic resins, such as for instance esterified colophony, phenol novolacs, modified phenol resins with natural resins, terpenephenol resins, alkyl phenol resins, resin polymers such as especially polystyrene or the like, can be used which have a relative adhesivity of 60% or more. This relative adhesivity will be determined by the following test:

100 g. of granular superphosphate was sieved to a grain size of 1.5–3.0 mm. Then 2 g. of the respective resin solids, finely ground in the manner set out above, were added to the superphosphate and each batch treated for 5 minutes in the same manner in a granulating disc. During this granulation the respective powders, due to their adhesivity, formed a substantially uniform layer, or coating, on the particles of superphosphate. The firmness of the adherence of these layers varied with the relative adhesivity of the respective resins. In order to test this relative adhesivity, the non-adherent part of the resin powder was separated from the granules on a 0.5 mm. sieve and the separated resin powder carefully weighed. The adherent part of the resin must be 60% or more of whole the resin powder on the superphosphate before sieving. In this test the following relative adhesivities of usable solid resins are determined: colophony 63%, oxidized colophony (Vinsol Resin) 75%, dimerized colophony (Dymerex) 96%, glycerol esterified colophony 77–91%, alkyl phenol resin 65%, terpene phenol resin 81–98%, modified phenol resin 72–89%, maleate resin 79–90%.

As stated, the physical characteristics of this second layer is of primary importance for as far as the seed protecting substance is concerned it may contain the same seed protecting substance as the first layer although this second layer may contain a different seed protecting substance or substances. The adhesivity of this second layer should be sufficient to adhere firmly to the carrier before the mixing operation takes place but at least a substantial part of this layer should readily transfer to the seed when the seed is mixed with the coated carrier. Naturally these relative adhesive characteristics will be effected by the surface characteristics of the seed and the carrier containing its base coat. Generally speaking it has been found that 20–80% of the adhesive substance and the contained active seed protecting substance should be retained on the carrier and 80–20% transferred to the seed during the mixing operation. Typically at least 60% of the second layer should be retained on the carrier and the remainder, for the most part, should be transferred to the seed.

In a typical situation the active seed protecting substance can be distributed equally in each layer so that each contains, for instance, 1.5% of the total weight of the granular drillable seed protecting agent, i.e. a total of 3% in the two layers. Depending upon the purpose for which the seed protecting agent is to be used and the type of seed to be treated, the active seed protecting substance may be incorporated in the respective layers in any other desired quantities and relative proportions. The mixing of the seed and the granular drillable seed protecting agent can be done in the simplest possible manner, for instance, in a fertilizer tub. The finished mixture of seed stock and seed protecting agent can be sowed either with a drill or by broadcasting. The ratio of seed stock to the seed protecting agents can be varied as desired within wide limits.

In the following purely illustrative examples, the parts are expressed as parts by weight.

*Example 1*

Ninety (90) kg. of pumice particles, with a grain size of 1 to 3 mm., were carefully mixed with 9 kg. of a mixture of 85 parts of precipitated chalk and 15 parts of gamma-hexachlorocyclohexane (Lindane). The precipitated chalk and the Lindane were both ground to a fineness of minus Din 100. Then 6 liters of a 20% pitch solution were added as a fine spray and mixing was continued until the first layer containing the effective substance had become firmly attached to the pumice carrier. The coating pumice was very resistant to abrasion. After drying 100 kg. of granulated material were obtained.

Then 97.7 kg. of this treated and coated granular material were intensely mixed with a carefully prepared dry mixture of 1.5 kg. of gamma-hexachlorocyclohexane (Lindane), 0.5 kg. of colophony, 0.07 kg. of manganese borate, 0.07 kg. of copper (oxide) and 0.16 kg. of calcium borate (Pandermit). Here, also, the resin component and the active material must be ground to a fineness of minus Din 100.

One obtains 100 kg. of a granular material with two layers containing seed protecting substances which now can be mixed in the desired ratio with seed stock to be protected. In each case, each individual grain of the seed stock has absorbed thereon, or adhering thereto, effective material from the second layer while the first layer represents a valuable reserve of effective substances which is utilized during the decomposition of this layer by moisture in the soil.

Ten (10) kg. of the seed protecting agent of theis example were mixed with 2 kg. of turnip-rooted cabbage seed and drilled into the soil. The germinating seed was protecting against cabbage flea-beetles and obtained, at the same time, a sufficient supply of micronutrients for its initial growth.

*Example 2*

(I)

| | Kg. |
|---|---|
| Carrier: Granulated superphosphate, 1 to 3 mm. | 90 |

(II)

First layer containing active seed protecting substance:

| | |
|---|---|
| Aldrine tech. | 1.5 |
| Precipitated chalk | 7.5 |
| Pitch powder | 1.0 |
| Water | 6.0 |
| (I) plus (II) equals | 106 |
| Dried equals | 100 |

(III)

| Second layer containing seed protecting substance: | |
|---|---|
| Applied on dried product (I) plus (II) | 98.0 |
| Aldrine tech. | 1.5 |
| Colophony | 0.5 |
| Finished drillable and protecting agent equals | 100.0 |

The coatings were applied as in Example 1.

The agent gave effective protection against carrot larvae and onion fly when it was, for instance, mixed and drilled into the soil in respective ratios of 40 kg. drillable seed protecting agent per 5 kg. of carrot seed and 20 kg. of drillable seed protecting agent per 10 kg. of onion seed.

*Example 3*

(I)

| | Kg. |
|---|---|
| Carrier: Granulated raw phosphate | 89 |

(II)

| First layer containing seed protecting substance: | |
|---|---|
| Lindane | 2.0 |
| Kieselguhr | 5.0 |
| Kaolin | 3.0 |
| Pitch powder | 1.0 |
| Water | 7.0 |
| (I) plus (II) equals | 107.0 |
| Dried equals | 100.0 |

(III)

| Second layer containing seed protecting substances: | |
|---|---|
| Applied on dried product (I) plus (II) | 97.6 |
| Tetramethylthiuramdisulfide (TMTD) | 0.4 |
| Lindane | 1.5 |
| Alkylphenol resin | 0.5 |
| Finished drillable seed protecting agent equals | 100.0 |

The two coating were applied as in Example 1.

Twenty (20) kg. of the drillable seed protecting agent of this example were mixed and drilled into soil together with 6 kg. of winter rape-seed. Through this treatment the germinating seed was protected from attacks by the rape-seed flea-beetle as well as against other germinating diseases.

It will be understood that the illustrative embodiments of this invention set out herein do not constitute a limitation upon the invention for those skilled in the are of protecting seed and increasing crop production can make various modifications in the details of these illustrative embodiments without departing from the teachings of the invention.

It will be understood, therefore, that this invention extends to all equivalent process details and equivalent products which would occur to those skilled in the art to which this invention appertains upon considering the teachings and spirit of the invention as set out herein and upon considering the scope of the invention as defined in the appended claims.

What is claimed is:

1. A granular drillable seed protecting agent for treating seeds, the particles of which comprise a granular non-germinating drillable carrier, a first layer over said carrier strongly adherent thereto and containing a seed protecting substance, said layer being at least partially decomposable by the moisture in the soil during the germination of the seed to be protected, and a powdery second adherent layer over said first layer the second layer containing a binding agent different from that of the first layer, adhering to the first layer less strongly than said first layer to the carrier, and containing a seed protecting substance which is at least partially transferable to seed mixed with the granular drillable seed protecting agent.

2. The seed protecting agent of claim 1 wherein the carrier is inert.

3. The seed protecting agent of claim 1 wherein the carrier is at least partially composed of a substance promoting plant growth.

4. A granular drillable seed protecting agent for treating seeds, the particles of which comprise a granular non-germinating drillable carrier, a first layer over said carrier strongly adherent thereto and containing a seed protecting substance, said layer being at least partially decomposable by the moisture in the soil during the germination of the seed to be protected, and a powdery second adherent resin layer over said first layer, the second layer containing a resin as adhesive which is different from the adhesive of the first layer, has a relative adhesivity of at least 60%, adheres to the first layer less strongly than said first layer to the carrier, and contains a seed protecting substance which is together with the second layer adhesive resin at least partially transferable to seed mixed with the granular drillable seed protecting agent.

5. A process for producing a granular drillable seed protecting agent for protecting seeds initially and during germination which comprises coating a granular non-germinating drillable carrier with a liquid adhesive containing a seed protecting substance, drying the coated carrier, thereby forming a dried abrasion resistant coating on the carrier, said dried coating being at least partially decomposable by water, and applying a dry adhesive agent and a dry seed protecting substance to form a powdery second adhesive coating over the first coating, said second coating containing a binding agent which is different in its chemical nature from the adhesive of the first coating, having a relative adhesivity of at least 60% and adhering to the first coating less strongly than said first coating to the uncoated carrier so that it is at least partially transferable to seed when mixed therewith.

6. The process of claim 5 wherein the adhesive substance in said second coating is a resin.

References Cited in the file of this patent

UNITED STATES PATENTS

| | | |
|---|---|---|
| 2,444,752 | Siegler | July 6, 1948 |
| 2,502,809 | Vogelsang | Apr. 4, 1950 |
| 2,502,996 | Rohner | Apr. 4, 1950 |
| 2,523,420 | Burrage | Sept. 26, 1950 |
| 2,644,769 | Robinson | July 7, 1953 |
| 2,706,163 | Fitko | Apr. 12, 1955 |
| 2,779,670 | Burkett | Jan. 29, 1957 |
| 2,806,773 | Pole | Sept. 17, 1957 |
| 2,839,444 | Ligett et al. | July 17, 1958 |
| 2,894,873 | Seven | July 14, 1959 |
| 3,062,637 | Marples et al. | Nov. 6, 1962 |

OTHER REFERENCES

Condensed Chemical Dictionary, fifth edition, published by Reinhold (N.Y.), 1956, pages 258, 259, 551 relied on.